United States Patent
Zeller et al.

[11] Patent Number: 5,926,404
[45] Date of Patent: Jul. 20, 1999

[54] COMPUTER SYSTEM WITH UNATTENDED OPERATION POWER-SAVING SUSPEND MODE

[75] Inventors: Charles P. Zeller, Austin; James L. Walker, Cedar Park; Kendall C. Witte, Austin, all of Tex.

[73] Assignee: Dell USA, L.P., Round Rock, Tex.

[21] Appl. No.: 08/968,383

[22] Filed: Nov. 12, 1997

Related U.S. Application Data

[63] Continuation of application No. 08/447,857, May 23, 1995, abandoned

[51] Int. Cl.$^6$ .................................................. G06F 1/00
[52] U.S. Cl. .................................... 364/707; 395/750
[58] Field of Search ........................ 364/707, 708.1, 364/492; 395/750, 375

[56] References Cited

U.S. PATENT DOCUMENTS

| | | | |
|---|---|---|---|
| 5,167,024 | 11/1992 | Smith et al. | 395/375 |
| 5,218,704 | 6/1993 | Watts, Jr. et al. | 395/750 |
| 5,239,495 | 8/1993 | Manno et al. | 364/707 |
| 5,303,171 | 4/1994 | Belt et al. | 364/707 |
| 5,404,546 | 4/1995 | Stewart | 395/750 |
| 5,532,935 | 7/1996 | Ninomiya et al. | 364/492 |
| 5,560,024 | 9/1996 | Harper et al. | 395/750 |

OTHER PUBLICATIONS

PICO/POWER A Cirrus Logic Company, "System Controller for Super-486 Processors", May 1995, Preliminary Data Book v1.0, pp. i–ii, pp. 102–106.

*Primary Examiner*—Emmanuel L. Moise
*Attorney, Agent, or Firm*—Skjerven, Morrill, MacPherson, Franklin & Friel, L.L.P.

[57] ABSTRACT

A portable computer is provided with enhanced power management capabilities. The portable computer includes a power management system which makes a determination as to whether the computer is "user attended" or "user unattended" based upon the position of the display screen in one embodiment. If the display screen is open, then the computer is regarded as being "user attended". In this case, a first timeout delay of I/O inactivity is applied before the computer is permitted to enter a power saving suspend mode. However, if the display screen is closed, then the computer is regarded as being "user unattended". Is this situation, a second timeout delay of I/O inactivity is applied before the computer is allowed to enter the power saving suspend mode. The second timeout delay is generally significantly shorter than the first timeout delay. This technique is found to significantly increase the reliability of I/O activities such as external communications with the computer when the computer is "user unattended".

53 Claims, 2 Drawing Sheets

COMPUTER SYSTEM WITH UNATTENDED OPERATION POWER-SAVING SUSPEND MODE

This application is a continuation of application Ser. No. 08/447,857, filed May 23, 1995, now abandoned.

BACKGROUND OF THE INVENTION

1. Field of the Invention

This invention relates in general to computer systems and, more particularly, to computer systems which are designed to partially power down or suspend operation when left unattended.

2. Description of Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a hard disk storage device and an optional printer. One of the distinguishing characteristics of these systems is the use of a system board or motherboard to electrically connect these components together. These personal computer systems are information handling systems which are designed primarily to give independent computing power to a single user and are inexpensively priced for purchase by individuals or small businesses.

Portable computers are often referred to as laptop, notebook or subnotebook computers. These computers typically incorporate a flat panel display such as a liquid crystal display (LCD) or other relatively small display. Generally, the panel display is incorporated into the lid of the computer which can be opened for use or closed for storage. Portable computers also often provide for coupling to a conventional standalone display monitor.

To be truly portable, these computers require a portable energy source such as an internal battery for example. The power demands placed on such an internal battery even in the best designed computer systems can be very substantial. The ever increasing performance of the microprocessors employed in today's portable computers corresponds to a similar increase in the power demands on the internal battery. At the same time, users desire relatively lightweight portable computers. The need for size and weight reduction in portable computers places a practical limit on the size of the internal battery used in the portable computer. Clearly, it is essential to be very efficient in the use of power which is supplied by the internal battery of the portable computer.

One known technique of power management to achieve battery conservation in a portable computer is to power down the machine when the user closes the lid of the computer. Another technique is to provide the user with a dedicated key combination or button ("hot key") which when activated sends the portable computer into a partially powered down or "suspend state" in which less energy is being consumed. For example, in such a "suspend state", the hard drive and/or panel display can be turned off to conserve power. The states of circuits internal to the computer are stored so that they can be later restored when operation resumes. In one approach, by simply entering a keystroke the computer resumes operation at the same point in the application where the user went into the suspend state. A modest time penalty is paid however by the user since a few seconds are required to power up the panel display and the hard drive and to restore the internal circuitry of the computer to former states before operation resumes. The above described power management approach is a form of suspend-resume operation which is manually activated by the user.

In a more advanced suspend-resume approach, it is possible for the suspend state to be automatically activated after a time period of no user activity has transpired. For example, if the lid is open and the user has keyed no characters into the keyboard in over 10 minutes, then the suspend mode is automatically entered. Many computers permit the user to select the duration of this timeout time period. Generally, users select this timeout time period to be a relatively long amount of time such as 10 minutes or more to avoid the frustration of the computer constantly powering down when the user pauses for thought or other activity.

Portable computer users desire both power conservation and computer availability. Unfortunately, these goals are in conflict. If the portable computer is fully powered up and ready for use at all times, then power conservation is at a minimum. In contrast, if the portable computer is nearly always in suspend mode, it is not available for immediate usage most of the time.

Current power management schemes either don't sustain activity when the lid is closed or fail to more aggressively conserve power. The increased use of portable computers as general purpose communicators increases the need for user unattended machines to be responsive when messages arrive at the computer through wireless communication devices or modems. It is noted that in some portable computers, closing the lid either forces an immediately suspend operation or the portable computer simply continues as if it were in use by the user. In the scenario where closing the lid forces an immediate suspend operation, the system can resume operation for communication or clock events. However, should even a relatively short duration gap occur in the communication event or stream, the system immediately returns to suspend mode and valuable data can be lost.

SUMMARY OF THE INVENTION

A computer system is disclosed which advantageously permits uninterrupted communication and other input/output operations while the lid is closed. This is accomplished while still obtaining power conservation. It has been discovered that, by providing the portable computer with a first suspend time out delay for the scenario where the lid is open and a second generally shorter suspend time out delay for the scenario where the lid is closed, communication reliability with the computer in the lid closed position is significantly improved. The scenario with the computer lid open corresponds generally to a user attended computer. The scenario with the computer lid closed corresponds generally to user unattended computer.

In accordance with one embodiment of the present invention, a portable computer system is provided which includes a processor to which a main memory is coupled. The computer system also includes a plurality of power consuming devices coupled to the processor. Such power consuming devices can includes disk drives, panel displays and other power consuming devices. The computer system further includes a power management circuit which is coupled to a power consuming devices. The power management circuit determines if the computer system is presently "user attended" or "user unattended". If the computer system is determined to be "user attended" and if a first time period of no input/output activity is exceeded, then the power management circuit powers down the computer system to a power conserving suspend state. Alternatively, if the computer system is determined to be "user unattended" and if a second time period of no input/output activity is exceeded, then the power management circuit also powers down the computer system to the suspend state.

In another embodiment of the invention, a portable computer system is provided which includes a processor and a system bus coupled to the processor. A main memory is coupled to the system bus. The computer system also includes a portable power source such as a battery to provide power to the system. The portable computer system further includes an integral panel display, coupled to the system bus to permit the processor to display output to the user. The panel display is movable between an open position and a closed position. The computer system further includes a power managing circuit, coupled to the portable power source and the processor, for determining if the panel display is in the open position or the closed position. When the panel display is in the open position, the computer system is assumed to be "user attended" When the panel display is in the closed position, the computer system is assumed to be "user unattended". The power managing circuit powers down the computer system to a suspend state if the panel display is determined to be in the open position and a first time period of no input/output activity has expired. Alternatively, the power managing circuit powers down the computer system to the suspend state if the panel display is determined to be in the closed position and a second time period of no input/output activity has expired.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
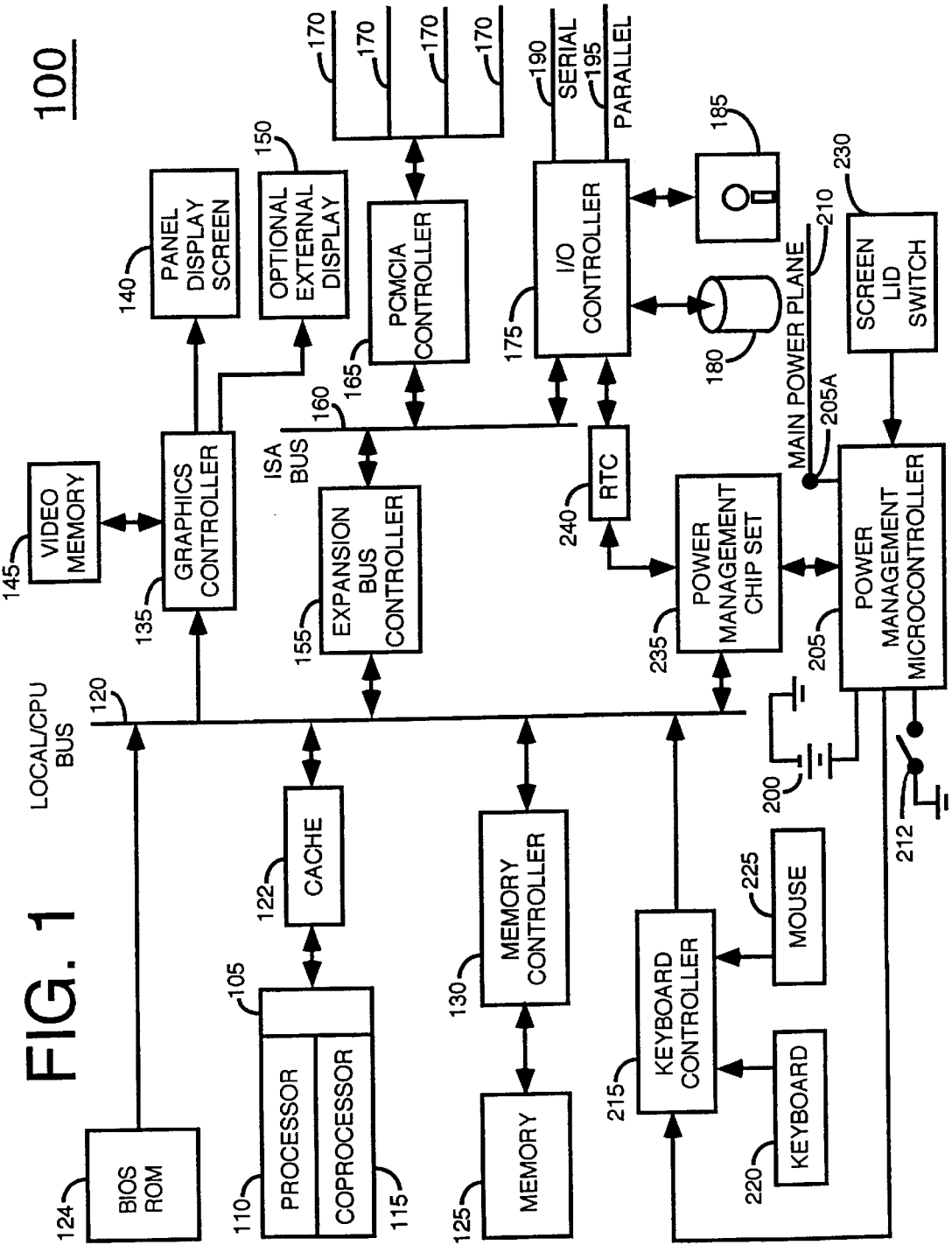
FIG. 1 is a block diagram of the disclosed portable computer with unattended operation power-saving suspend mode

FIG. 1 is a block diagram of a portable computer 100 which employs the disclosed power saving methodology. Computer 100 includes a microprocessor 105 having a processor 110 for handling integer operations and a coprocessor 115 for handling floating point operations. One microprocessor which can be employed as microprocessor 105 is the model 80486 microprocessor manufactured by Intel. Microprocessor 105 is coupled to a local bus 120 via cache memory 122. A Basic Input Output System (BIOS) ROM 124 is coupled to local bus 120. BIOS ROM 124 stores the system microcode which controls the operation of computer 100. More particularly, BIOS ROM 124 stores software which implements the later described power conservation technique.

A main memory 125 of dynamic random access memory (DRAM) modules is coupled to local bus 120 by a memory controller 130. A graphics controller 135 is coupled to local bus 120 and to a panel display screen 140. Graphics controller 135 is also coupled to a video memory 145 which stores information to be displayed on panel display 140. Panel display 140 is typically an active matrix or passive matrix liquid crystal display (LCD) although other display technologies may be used as well. Graphics controller 135 can also be coupled to an optional external display or standalone monitor display 150 as shown in FIG. 1. One graphics controller that can be employed as graphics controller 135 is the Western Digital WD90C24A graphics controller.

A bus interface controller 155 couples local bus 120 to a bus 160 which is an industry standard architecture (ISA) bus or other bus architecture, if desired. A PCMCIA (Personal Computer Memory Card International Association) controller 165 is also coupled to expansion bus 160 as shown. PCMCIA controller 165 is coupled to a plurality of expansion slots 170 to receive PCMCIA expansion cards such as modems, fax cards, communications cards and other input/output devices.

An I/O controller 175 referred to as a super I/O controller is coupled to ISA bus 160 as shown in FIG. 1. I/O controller 175 interfaces to both an integrated drive electronics (IDE) hard drive 180 and a floppy drive 185. I/O controller 175 also provides a serial port 190 and a parallel port 195 to which peripheral devices can be coupled.

Computer 100 includes a battery 200 which provides power to the many devices which form computer 100. Battery 200 is typically a rechargeable battery such as a nickel metal hydride (NiMH) or lithium ion battery, for example. Battery 200 is coupled to a power management microcontroller 205 which controls the distribution of power from battery 200. More specifically, microcontroller 205 includes a power output 205A coupled to the main power plane 210 which supplies power to microprocessor 105. Power microcontroller 205 is also coupled to a power plane (not shown) which supplies power to panel display 140. In this particular embodiment, power control microcontroller 205 is a Motorola 6805 microcontroller. Microcontroller 205 monitors the charge level of battery 200 to determine when to charge and when not to charge battery 200. Microcontroller 205 is coupled to a main power switch 212 which the user actuates to turn the computer on and off. While microcontroller 205 powers down other portions of computer system 100, microcontroller 205 itself is always coupled to a source of energy, namely battery 200. Microcontroller 205 exhibits a low power consumption state when the later discussed suspend mode is invoked.

Power management microcontroller 205 is also coupled to a keyboard controller 215 which is coupled to local bus 120. A keyboard 220 and mouse 225 are coupled to keyboard controller 215 so that user input can be provided to portable computer 100. One microcontroller that can be used as keyboard controller 215 is the model 8051 microcontroller manufactured by Intel.

Portable computer 100 includes a screen lid switch 230 or indicator 230 which provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer which swings from an open position for user attended operation to a closed position when the computer is unattended.

Portable computer 100 also includes a power management chip set 235 which includes power management chip models WD8110 and WD76C25 manufactured by Western Digital. Power management chip set 235 is coupled to microprocessor 105 via local bus 120 so that power management chip set 235 can receive power control commands from microprocessor 105. Power management chip set 235 is connected to a plurality of individual power planes which supply power to respective devices in computer 100 such as hard drive 180 and floppy drive 185, for example. In this manner, power management chip set 235 acts under the direction of microprocessor 105 to control the power to the various power planes and devices of the computer. A real time clock (RTC) 240 is coupled to I/O controller 175 and power management chip set 235 such that time events or alarms can be transmitted to power management chip set 235. Real time clock 240 can be programmed to generate an alarm signal at a predetermined time.

Portable computer 100 is provided with two timeout delays, the first timeout delay, T1, being selectable by the user, the second timeout delay, T2, being fixed in the preferred embodiment. (The term "fixed" as used herein means non-user selectable or factory preset.) Depending on which one of these timeout delays is presently invoked, computer 100 will enter a partially powered down "suspend state" after either a time period T1 or T2 of input/output (I/O) inactivity expires. I/O activity includes such events as keystrokes, mouse movement, activity on serial port 190 or parallel port 195, alarm events at real time clock 240, I/O activity at PCMCIA slots 170 such as communication from a modem (rings, data) coupled to controller 165 and other I/O activity.

The first timeout delay, T1, is applied in operational scenarios where the user is regarded as being present. This is referred to as "user attended operation". For example, if screen lid switch 230 indicates that the display screen lid is open, then "user attended operation" is assumed. Also, if an optional display 150 is presently coupled to computer 100, then "user attended operation" is assumed. In these cases of "user attended operation", the first timeout delay is applied such that the computer 100 enters the suspend state after a time period, T1, of I/O inactivity is exceeded. As mentioned earlier, the first timeout delay, T1, is set by the user. A user would be expected to set the first timeout delay, T1, to a relatively long period of time such as 10 minutes or more to avoid the frustration of the computer frequently powering down after short pauses in user activity. Once computer 100 is in the power-saving suspend state after the timeout delay, T1, of I/O inactivity is exceeded, the computer will resume an active powered up state when I/O activity, such as a user keystroke, is detected. The "user attended" computer is thus provided with a first level of power conservation since it partially powers down to a suspend state in response to I/O inactivity The second timeout delay, T2, is applied when the user is generally not regarded as being present and this is referred to as "user unattended operation". This feature advantageously supplies a more aggressive type of power management. "User unattended operation" is assumed when screen lid switch 230 indicates that the display screen lid is closed and no external display 150 is coupled to computer 100. When these conditions are found, computer 100 employs the second timeout delay, T2, as the length of time of I/O inactivity which must be exceeded before computer 100 enters the partially powered down suspend state. The second timeout delay, T2, is generally substantially shorter than the first timeout delay. In one embodiment, the second timeout delay is approximately 1 minute. Typically, the second timeout delay is within the range of approximately 10 seconds to approximately 1 minute, although a second timeout delay of up to approximately 5 minutes can also be useful. Timeout delays, T2, other than this range can also be used depending on the particular application. What is important, however, is that the timeout delay, T2, be selected to be sufficiently long that computer 100 does not timeout during I/O activities which tend to occur in spaced-apart bursts or segments such as packet transmissions from cellular modems and other communication protocols.

The operation of the second timeout delay in the "user unattended" operational scenario is now discussed. It is assumed that the applicable timeout delay (T1 if the computer was earlier user attended or T2 if the computer is presently user unattended) has been exceeded and that the computer is therefore already in the partially powered down suspend state. A modem (not shown) in one of PCMCIA slots 170 receives a call when the screen lid is closed. The computer is thus now regarded as being "user unattended". The call initiates with rings which are to be followed by data in a communication protocol having spaced apart packets. Power management chip set 235 is notified of the ring activity and powers up the computer to resume operation and service the communication. It is important that the computer not immediately return to the suspend mode during momentary pauses in this I/O activity. Otherwise valuable data can be lost. The second timeout delay helps to assure that computer 100, in the user unattended scenario, does not return to the suspend state until after the I/O activity is completed.

It is noted that the first timeout delay, T1, is also referred to as the "attended timeout delay" because it is applied in operational scenarios where the computer is regarded as being attended by the user, such as when the screen lid is open and available for viewing by the user. The second timeout delay, T2, is also referred to as the "unattended timeout delay" because it is applied in operational scenarios where the computer is believed to be not attended by the user, such as when the screen lid is closed. The computer user is thus provided with a computer which invokes a second timeout delay tailored for the scenario when the computer is unattended (lid closed) and yet the computer can service I/O activities which occur in spaced apart segments without undesirably timing out and suspending operation. Potential data loss is thus prevented.

By pressing a predetermined key or key sequence the user can immediately "hot key" to the suspend mode. In other words when the "hot key" is depressed, the computer system proceeds directly to the power saving suspend mode without waiting for the first or second timeout.

Figure 2:
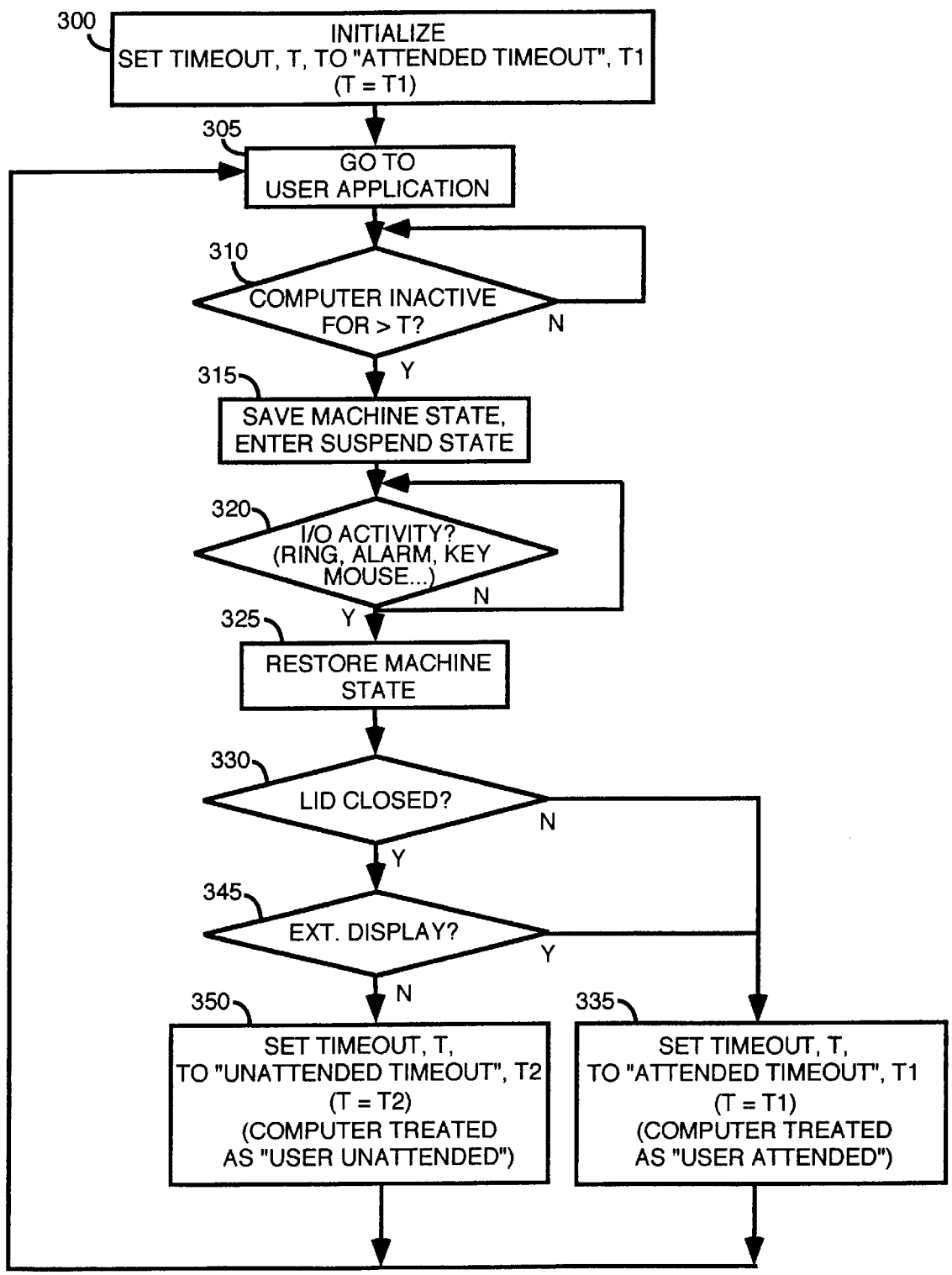
FIG. 2 is a flow chart depicting the operational flow of disclosed power saving methodology

FIG. 2 is a flow chart which depicts the operational flow of the power management method employed in computer 100. This flow chart describes the power management software which controls the operation of computer 100 to achieve the above described advantages. In actual practice, the power management software described by the flow chart of FIG. 2 is stored in BIOS ROM 124 from which it is executed by microprocessor 105.

Computer system 100 is initialized as indicated at block 300. More specifically, when computer 100 is initially powered up, conventional power-on-self-test (POST) and diagnostic routines are run as the BIOS code in BIOS ROM 124 starts to execute. The timeout delay, T, is defined as the amount of time which must transpire from the last I/O activity before the computer system enters the suspend mode. The exception is the earlier discussed "hot key" situation wherein the computer system immediately enters the suspend mode upon receiving a particular key or key sequence. As part of initializing the system, the timeout delay, T, is set to the attended timeout delay, T1. In the BIOS set-up screen which is accessible by the user, the user can set the desired time period for the attended timeout delay, T1. The user would typically set this T1 value to a relatively long amount of time such as 10–15 minutes or more. In a preferred embodiment, the unattended timeout delay, T2, is fixed at a predetermined time such as approximately 1 minute. The unattended timeout delay, T2, is typically factory preset and can be stored as data in BIOS ROM 124 or other permanent storage if desired. However, in an alternative embodiment, this value also can be set by the user when the user accesses the BIOS set-up screen. As discussed earlier, it is generally desirable to have this T2 timeout value be a relatively short amount of time to promote power conservation in the "user unattended" state and yet sufficiently long to ride out momentary interruptions in I/O activities.

After initialization, the computer then loads and executes the user application as indicated in block 305. For purposes of discussion it is assumed that the screen lid of the computer is open and that the computer is in the "user attended" state or mode. Thus, the attended timeout delay, T1, is the period of I/O inactivity which must presently be exceeded before the computer enters the suspend mode. Accordingly, a test is conducted at decision block 310 to determine if the computer has been inactive for a time period greater than the attended timeout delay, T1. If the attended timeout delay, T1, is not exceeded, testing continues until the attended timeout is finally exceeded. It should be understood that any I/O activity will restart this test. When a period of I/O inactivity passes which is sufficiently long to exceed the attended timeout delay, T1, then computer 100 enters the partially powered down suspend state at block 315. The operational state of the machine is saved. Essentially, all chips in the computer system which are powered down in the suspend mode have their register contents saved so that the register contents can subsequently be restored.

A test is then conducted at decision block 320 to determine if there has been any I/O activity. This I/O activity test can be readily performed by system hardware. This test includes testing for I/O activity such as keystrokes, mouse motion, modem communication, rings, alarms from the real time clock, disk access and other I/O activity. If no I/O activity is found, then the test continues. However, once I/O activity is again found, then the previously saved machine state is restored as per block 325.

Testing is now conducted to determine whether the computer is regarded as being "user attended" or "user unattended". More specifically, in this particular embodiment, a test is conducted at decision block 330 to determine if the screen lid is closed. If the lid is found to be not closed (ie. open), then the computer is regarded as being "user attended" and at block 335 the attended timeout delay, T1, is set as the time period of inactivity, T, which must be exceeded before the computer enters the suspend state. Process flow then continues to back to block 305 where the user application is again executed. The timeout delay, T1, continues to be applied.

If testing block 330 determines that the screen lid is closed, then a further test is conducted at decision block 345 to determine if an external display is attached to the computer. If an external display is found to be attached to the computer, then the computer is again considered to be "user attended" and process flow again continues to block 335 where the attended timeout delay, T1, is set. Process flow then continues to back to block 305 where the user application is again executed. The timeout delay, T1, continues to be applied.

However, if testing block 330 finds that the screen lid is closed and testing block 345 finds that no external display is coupled to the computer, then the computer is considered to be "user unattended". In this scenario, process flow continues to block 350 at which the unattended timeout delay, T2, is set as the time period of inactivity, T, which must be exceeded before the computer enters the suspend state. Process flow then continues to block 305 where the user application is again executed with the unattended timeout delay, T2, being operative.

It is noted that the presently applicable timeout delay, T, can either be the "user attended" timeout delay, T1, if certain conditions occur as described above, or can also be the "user unattended" timeout delay, T2 if other conditions occur as described above. When the presently applicable timeout delay, T, is exceeded by a particular period of I/O inactivity, then computer 100 goes into the suspend mode as per block 315.

A "hot key" feature was discussed earlier wherein by pressing a predetermined key or key sequence the user can immediately cause the computer system to enter the power saving suspend mode without the computer system waiting for the first or second timeout. This feature can be readily implemented in software in the system BIOS or alternatively can be directly implemented in hardware.

While a computer apparatus with improved power management is described above, a method of conserving power in a portable computer system is also disclosed. The computer system on which the method is practiced includes power consuming devices which are coupled to a portable power supply. The method includes the step of determining if the portable computer system is presently "user attended" or "user unattended". The method also includes the step of powering down the portable computer system to a suspend state if in the determining step the computer system is determined to be "user attended" and a first time period of no input/output activity has expired. The method also includes the step of powering down the portable computer system to a suspend state if in the determining step the computer system is determined to be "user unattended" and a second time period of no input/output activity has expired.

In another embodiment of the disclosed power conserving methodology, the method is practiced on a portable computer system which includes an integral panel display which is movable from an open position to a closed position. An integral portable power supply provides power to the portable computer system. The method includes the step of determining if the integral panel display is in the open position or the closed position. The method also includes the step of powering down the portable computer system to a suspend state if in the determining step the integral panel display is in the open position and a first time period of no input/output activity has expired. The method also includes the step of powering down the portable computer system to the suspend state if in the determining step the integral panel display is in the closed position and a second time period of no input/output activity has expired.

In summary, a first timeout delay, T1, is applied as a condition to entering the suspend state in the situation where the computer system is determined to be "user attended". Alternatively, a second timeout delay, T2, is applied as a condition to entering the suspend state in the situation when the computer system is determined to be "user unattended". In the particular example discussed above, the determination as to whether the computer system is regarded is being "user attended" or "user unattended" is made by studying the open/closed status of the screen display. If the display is open, then the computer system is regarded as being "user attended". If the screen display is closed, the computer system is regarded as being "user unattended", provided no external display is attached to the computer system. If the screen display is closed and an external display is attached to the computer system, then the computer system is regarded as being "user attended" and the first timeout delay, T1, is applied.

It should be noted that the criteria discussed above for determining whether the computer system is to be regarded as being "user attended" or "user unattended" are provided for purposes of illustration and that other criteria may be used as well to make this determination. For example, in one embodiment the computer continually tests for keystrokes on keyboard 215. If a keystroke is detected on keyboard 215, then the power management system assumes that the computer system is "user attended" and the first timeout delay, T1, is applied, In another embodiment, the generation of an alarm by RTC 240 or the reception of a ring by a modem attached to PCMCIA controller 165 or I/O controller 175 can be tested for and interpreted as being indicative of a "user unattended" computer system, in which case the second timeout delay, T2, is applied. In yet another embodiment, computer system 100 includes an ultrasonic or other motion sensor which interprets motion in the proximately of the computer system as being indicative of a "user attended" computer system, in which case the first timeout delay, T1, is applied. Other sensors of the presence of a user can also be employed.

The foregoing has described a computer system which provides enhanced power management. The computer system advantageously achieves more reliable communication activities and other input/output activities when the computer is "user unattended", such as when the screen or lid is closed. This improvement in I/O transaction reliability is accomplished while still obtaining significant power conservation.

While only certain preferred features of the invention have been shown by way of illustration, many modifications and changes will occur. For example, while the power management apparatus includes hardware and software structures spread over many components in the disclosed computer system, it is possible to join power management structures together in an applications specific integrated circuit (ASIC). It is, therefore, to be understood that the present claims are intended to cover all such modifications and changes which fall within the true spirit of the invention.

We claim:

1. A portable computer system comprising:
    a processor;
    a main memory coupled to the processor;
    a plurality of power consuming devices coupled to the processor; and
    power managing means, coupled to the processor, for determining if the computer system is presently user attended or user unattended, the power managing means powering down the computer system to a suspend state if the computer system is determined to be attended and a first the period of no input/output activity has expired, the power managing means powering down the computer system to the suspend state if the computer system is determined to be unattended and a second time period of no input/output activity has expired, the second time period being a non-zero time period.

2. The portable computer system of claim 1 further comprising first selecting means, coupled to the power managing means, for selecting the first time period.

3. The portable computer system of claim 1 further comprising second selecting means, coupled to the power managing means, for selecting the second time period.

4. The portable computer system of claim 1 wherein the second time period is fixed.

5. The portable computer system of claim 1 wherein said power managing means includes resume operation means for causing the computer system to change from the suspend state to an operational state when input/output activity occurs.

6. The portable computer system of claim 1 wherein one of the plurality of power consuming devices is an integral display screen which is movable from an open position to a closed position.

7. The portable computer system of claim 6 further comprising a display screen opened/closed indicator, the power managing means being coupled to the indicator to determine that the computer system is user attended when the indicator indicates that the display screen is in the open position and to determine that the computer system is user unattended when the indicator indicates that display screen is in the closed position.

8. The portable computer system of claim 1 wherein the first time period is greater than the second time period.

9. A portable computer system comprising:
    a processor;
    a system bus coupled to the processor;
    a main memory coupled to the system bus;
    a portable power source situated in the portable computer system to provide power thereto;
    an integral panel display coupled to the system bus to permit the processor to display output to the user, the panel display being movable between an open position and a closed position; and
    power managing means, coupled to the portable power source and the processor, for determining if the integral panel display is in the open position or the closed position, the power managing means powering down the computer system to a suspend state if the integral panel display is determined to be in the open position and a first time period of no input/output activity has expired, the power managing means powering down the computer system to the suspend state if the integral panel display is determined to be in the closed position and a second time period of no input/output activity has expired, the second time period being a non-zero time period.

10. The portable computer system of claim 9 further comprising a plurality of power consuming devices coupled to the power managing means.

11. The portable computer system of claim 9 wherein the portable power source comprises an electrical battery.

12. The portable computer system of claim 9 wherein the first time period is greater than the second time period.

13. The portable computer system of claim 9 further comprising first selecting means, coupled to the power managing means, for selecting the first time period.

14. The portable computer system of claim 9 further comprising second selecting means, coupled to the power managing means, for selecting the second time period.

15. The portable computer system of claim 9 wherein the second time period is fixed.

16. The portable computer system of claim 9 wherein said power managing means includes resume operation means for causing the computer system to change from the suspend state to an operational state when input/output activity occurs.

17. The portable computer system of claim 9 further comprising a display port for coupling the computer system to an external display.

18. The portable computer system of claim 17 wherein the power managing means includes external display testing means for determining if an external display is coupled to the display port.

19. The portable computer system of claim 18 wherein the power managing means powers down the computer system to the suspend state if the external display is determined to be coupled to the display port and the first time period of no input/output activity has expired.

20. A portable computer system comprising:
  a plurality of power consuming devices; and
  a power management circuit coupled to control the transfer of power to at least one of the power consuming devices, the power management circuit determine if the computer system is user unattended when the portable computer system is on, the power management circuit causing less power to be transferred to at least one of the power consuming devices after a first user-programmable time period of no input/output activity if the computer system is determined to be us attended, the power management circuit causing less power to be transferred to at least one of the power consuming vices after a second user-programmable time period of no input/output activity if the computer system is determined to be user unattended.

21. The portable computer system of claim 20 wherein the plurality of portable consuming devices comprises:
  a processing unit;
  a memory coupled to the processing unit; and
  a display coupled to the processing unit.

22. A method of conserving power in a portable computer system, the portable computer system including power consuming devices which are coupled to a portable power supply, the method comprising the steps of:
  determining if the portable computer system is presently user attended or us unattended;
  powering down at least one of the power consuming devices to a suspend state if in the determining step the computer system is determined to be user attended and a first time period of no input/output activity has expired; and
  powering down at least one of the power consuming devices to a state if in the determining step the computer system is determined to be user unattended and a second time period of no input/output activity has expired, the second time period being a non-zero time period.

23. The method of claim 22 wherein the first time period is greater than the second time period.

24. The method of claim 22 further comprising the step of selecting the first time period.

25. The method of claim 22 further comprising the step of selecting the second time period.

26. The method of claim 22 wherein the second time period is fixed.

27. The method of claim 22 further comprising the step of determining if input/output activity has commenced in the computer system.

28. The method of claim 27 further comprising the step of resuming fully powered up operation of the at least one of the power consuming devices when input/output activity commences in the computer system.

29. The method of claim 22 wherein the portable computer system includes an integral display screen which is movable between an open position and a closed position, the step of determining if the portable computer system is presently user attended or user unattended including testing the position of the integral display screen to find if the integral display screen is open or closed to indicate whether the portable computer system is user attended or user unattended, respectively.

30. The method of claim 22 wherein the portable computer includes a display port for coupling to an optional external display, the step of determining if the portable computer system is presently user attended or user unattended including testing to find if an external display is coupled to the display port, the presence of an optional external display indicating that the computer system is user attended, the absence of an optional display indicating that the computer system is user unattended.

31. A method of conserving power in a portable computer system, the portable computer system including an integral panel display which is movable from an open position to a closed position, the portable computer system including a portable power supply, the method comprising the steps of:
  determining if the integral panel display is in the open position or the closed position;
  powering down the portable computer system to a suspend state if in the determining step the integral panel display is in the open position and a first time period of no input/output activity has expired; and
  powering down the portable computer system to the suspend state if in the determining step the integral panel display is in the closed position and a second time period of no input/output activity has expired, the second time period being a non-zero time period.

32. The method of claim 31 wherein the first time period is greater than the second time period.

33. The method of claim 31 further comprising the step of selecting the first time period.

34. The method of claim 31 further comprising the step of selecting the second time period.

35. The method of claim 31 wherein the second time period is fixed.

36. The method of claim 31 further comprising the step of determining if input/output activity has commenced in the computer system.

37. The method of claim 36 further comprising the step of resuming fully powered up operation of the computer system when input/output activity commences in the computer system.

38. The method of claim 31 wherein the portable computer includes a display port for coupling to an optional external display, the method further comprising the step of testing to find if an external display is coupled to the display port.

39. The method of claim 38 further comprising the step of powering down the portable computer system to a suspend state after a first time period has expired and both the integral panel display is in the closed position and an external display is coupled to the display port.

40. A method of cons power in a portable computer system, the method comprising:
  initializing a time-out period to an attended time-out time upon system initialization;

determining if the portable computer system is attended or unattended;

determining if an I/O event has occurred;

setting the time-out period to the attended time-out time upon an I/O event if the portable computer system is attended;

setting the time-out period to an unattended time-out time upon an I/O event if the portable computer system is unattended, the unattended time-out time being a non-zero time;

determining if the time-out period has expired;

powering down the portable computer system to a suspend state if the time-out period has expired; and powering up the portable computer system if an I/O event has occurred and the portable computer system is in the suspend state.

41. A method of conserving power in a portable computer system as recited in claim 40, the portable computer system including an integral display which is movable from an open position to a closed position, wherein the determining if the portable computer system is attended or unattended comprises:

determining that the portable computer system is attended if the integral display is in the open position.

42. A method of conserving power in a portable computer system as recited in claim 41, wherein the determining if the portable computer system is attended or unattended further comprises:

determining that the portable computer system is attended if the integral display is in the closed position and if an external display is coupled to the portable computer system; and determining that the portable computer system is unattended if the integral display is in the closed position and if an external display is not coupled to the portable computer system.

43. A method of conserving power in a portable computer system as recited in claim 40, wherein the determining if the portable computer system is attended or unattended comprises detecting the presence of a user by a wave energy detection device for detecting at least one of the group consisting of electromagnetic waves and acoustic waves.

44. A method of conserving power in a portable computer system as recited in claim 40, wherein the determining if an I/O event has occurred comprises at least one of the group consisting of the following:

detecting a keystroke of a keyboard of the portable computer system;

detecting an alarm of a real time clock circuit of the portable computer system; and detecting an incoming call on a modem of the portable computer system.

45. A method of conserving power in a portable computer system as recited in claim 44, wherein the determining if the portable computer system is attended or unattended comprises at least one of the following:

determining that the portable computer system is attended if a keystroke of a keyboard of the portable computer system is detected;

determining that the portable computer system is unattended if an alarm of a real time clock circuit of the portable computer system is detected; and determining that the portable computer system is unattended if an incoming call on a modem of the portable computer system is received.

46. A method of conserving power in a portable computer system as recited in claim 40, wherein the powering down the portable computer system to a suspend state if the time-out period has expired comprises:

saving the state of the portable computer system; and lowering power usage of the portable computer system.

47. A method of conserving power in a portable computer system as recited in claim 46, wherein the powering up the portable computer system if a user or communications I/O event has occurred and the portable computer system is in the suspend state comprises:

increasing power usage of the portable computer system; and restoring the portable computer system to the saved state.

48. A method of conserving power in a portable computer system as recited in claim 40, wherein the initializing the time-out period to an attended time-out time upon system initialization comprises one of the group consisting of:

initializing the time-out period to an attended time-out time when the system is turned on; and initializing the time-out period to an attended time-out time after the system is reset.

49. A method of conserving power in a portable computer system as recited in claim 40, the method further comprising:

powering down the portable computer system to a suspend state responsive to a hot-key input.

50. An apparatus for conserving power in a portable computer system, the comprising:

a computer-readable storage medium; and an initialization module stored on the computer-readable storage medium, the initialization module for initializing a time-out period to an attended time-out time upon system initialization;

a determination module stored on the computer-readable storage medium, the determination module for detecting the occurrence of I/O events and for determining the attended/unattended state of the portable computer system;

a timer setting module stored on the computer-readable storage medium, the timer setting module for setting the time-out period to the attended time-out time upon an I/O event if the portable computer system is attended and for setting the time-out period to an unattended time-out time upon an I/O event if the portable computer system is unattended, the unattended time-out time being a non-zero time;

a time-out detection module stored on the computer-readable storage medium, the time-out detection module for determining if the time-out period has expired; and a power management module stored on the computer-readable storage medium, the power management module for powering down the portable computer system to a suspend state if the time-out period has expired and for powering up the portable computer system if an I/O event has occurred and the portable computer system is in the suspend state.

51. An apparatus as recited in claim 50, the apparatus further comprising a hot-key module stored on the computer-readable storage medium, the hot-key module for causing the computer system to enter the suspend state without waiting for the time-out period to expire responsive to detecting a hot-key input.

52. An apparatus as recited in claim 50 wherein the computer-readable storage medium is a non-volatile memory; and the modules are firmware modules stored within a basic input/output system.

53. An apparatus as recited in claim 50 wherein the apparatus is a computer system, the apparatus further comprising a portable power source and a plurality of power consuming devices coupled to the portable power source, the modules stored on the computer-readable storage medium managing the power received by the power consuming devices from the portable power source when the computer system is on.

* * * * *